UNITED STATES PATENT OFFICE.

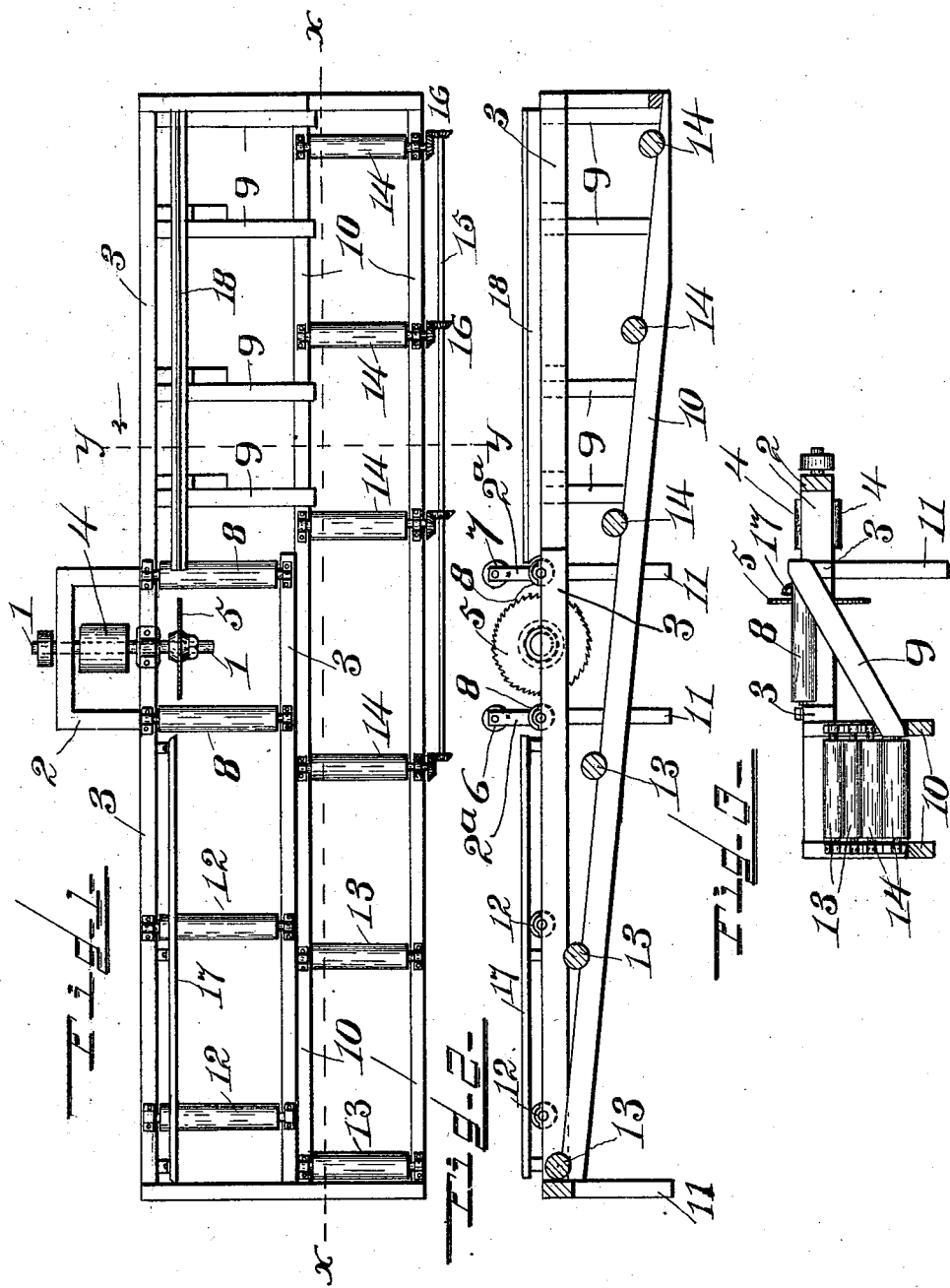

SAMUEL S. INGMAN, OF GEORGETOWN, SOUTH CAROLINA.

QUARTER-SAWING MACHINE.

SPECIFICATION forming part of Letters Patent No. 548,991, dated October 29, 1895.

Application filed March 18, 1895. Serial No. 542,284. (No model.)

*To all whom it may concern:*

Be it known that I, SAMUEL S. INGMAN, a citizen of the United States, residing at Georgetown, in the county of Georgetown and State of South Carolina, have invented certain new and useful Improvements in Quarter-Sawing Machines, of which the following is a specification.

My invention relates to wood-sawing machines, and particularly to what is known to the trade as a "rift" or "quarter-sawing" machine, and the object of the invention is to provide a machine of very simple, cheap, and durable construction.

A further object of the invention is to provide a mechanism which shall automatically discharge the material from the saw and return it with perfect accuracy and speed to its starting-point to be resawed.

A still further object of the invention is to provide an improved means for carrying the material from the saw to the return-rollers which shall insure such material taking said rollers to be returned to its starting-point.

Other objects and advantages warranting improved results will be hereinafter set forth, and pointed out in the appended claims.

With these ends in view my invention consists in certain features of construction and arrangement of parts, and essentially in the automatic discharge and return mechanism.

In the accompanying drawings, forming part of this application, Figure 1 is a top plan view without driving-power connections and with the rollers 6 and 7 and frame 2ª removed. Fig. 2 is a sectional view taken on the plane indicated by dotted line $x$ $x$ in Fig. 1. Fig. 3 is a cross-section taken on the plane indicated by the dotted line $y$ $y$ in Fig. 1, looking in the direction pointed by the arrow $a$, without the shaft, pinion, and guide-strip.

The same reference-numerals denote the same parts throughout the several figures of the drawings.

The arbor or shaft 1 is journaled in the frame 2 at one end and at the other in the main frame 3, and carries the pulley 4 and saw 5. A top roller 6 is journaled upon the frame 2ª in front of the saw, and a like roller 7 is similarly journaled in the rear of the saw.

Directly beneath the rollers 6 and 7 are journaled on the frame 3 rollers 8. These two rollers, with the other said rollers, carry the material which is termed by the trade "cant," "flitch," or "deal" through the saw and deposit it upon a series of slideways 9. These slideways 9 are secured at one end to the frame 3 in the rear of the roller 8 and slant downwardly at an angle to the return-frame 10, where they are secured at their other end. The slideways are graduated—that is, they increase in length from the said roller 8 in the rear of the saw to the end of the frame 3—and the return-frame 10 is inclined upwardly from the longest or rear end slideway to the front end of the frame 3, both frames being secured to uprights 11.

Journaled upon the forward end of the frame 3 are dead feed-rollers 12, while similar dead rollers 13 are journaled upon the forward end of the return-frame 10. A set of return feed-rollers 14 are journaled upon the rear end of the frame 10, and are revolved by a shaft 15 and pinions 16. Adjustable gage 17 is secured upon the main frame at the front of the saw. 18 is a strip to guide the material onto the slideways.

It will be understood that the slanting slideways and inclined return-frame, having rollers, constitute my automatic discharge and return mechanism.

It will be seen, without detail description, that a "cant" immediately upon leaving the saw slides down the ways 9 onto rollers carried by the rear end of the return-frame and at once is carried back to the front of the machine in position to be sawed again or removed without the operator leaving his position.

It will be observed that any number, more or less, of the slideways may be employed and that they as well as the return-frame may be placed at such angles from the main frame as desired. I therefore wish it to be understood that all such variations form a part of my invention.

Having thus described my invention, what I claim as new, and desire to secure by Letters Patent, is—

1. The combination with a sawing machine, of an automatic discharge and return mechanism, comprising the inclined return frame provided with rollers, and the slide-ways slanting from the main frame of the machine downwardly to the said return frame, as set forth.

2. The combination in a sawing machine, the main frame, the inclined return frame, having feed rollers, and a series of slanting slide-ways graduated in length to the inclination of the return frame and connecting the two said frames, as set forth.

In witness whereof I hereunto set my hand in the presence of two witnesses.

SAMUEL S. INGMAN.

Witnesses:
C. A. DOAR,
J. M. LOCHKART.